June 9, 1942. R. E. ROUSSEAU ET AL 2,286,108
DRIVING MECHANISM
Filed Oct. 9, 1939
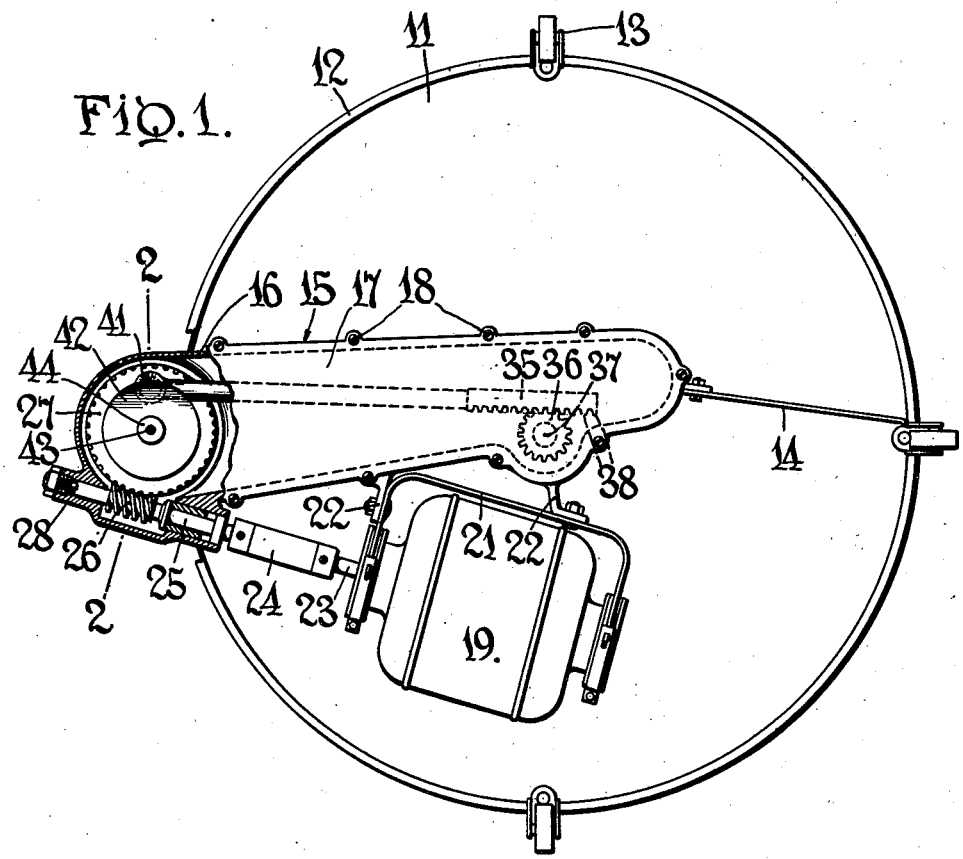
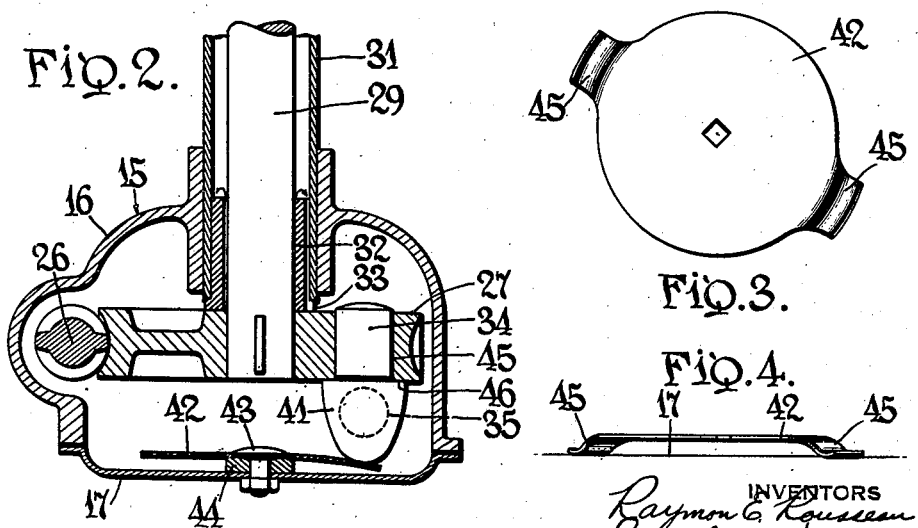
INVENTORS
Raymon E. Rousseau &
Luke J. Strauss.

Patented June 9, 1942

UNITED STATES PATENT OFFICE 2,286,108

DRIVING MECHANISM

Raymon E. Rousseau, Buffalo, and Luke J. Strauss, Snyder, N. Y.

Application October 9, 1939, Serial No. 298,620

9 Claims. (Cl. 74—77)

The present invention relates to driving mechanism for washing machines and the like, and has particular relation to such drives wherein an oscillatory movement is imparted to an agitating unit.

In such driving mechanisms, a worm wheel secured to an upright shaft is rotated by a motor driven worm and is connected by a pin to a pitman or rack bar which it reciprocates to effect angular oscillation of an agitating unit. Such an agitating unit when operating in washing fluid with submerged fabrics subjects the fluid and fabrics to accelerating and decelerating forces, and the fluid and fabrics, having considerable inertia and momentum at different phases of the operating cycle, also impose accelerating and decelerating forces upon the agitating unit. Due to variation of the load which is thereby imposed by the agitating unit on the pitman or rack bar at different phases of the latter's reciprocation, forces are imposed upon the worm and worm wheel, tending to shift them relative to their bearings. This causes gear noise due to the change of mesh between the worm wheel and the worm, and also causes pounding on their radial and thrust bearings.

According to the present invention, a resilient disc is mounted beneath the upright shaft, coaxial therewith, for pressing upwardly and outwardly upon the crank pin which connects the rack bar to the worm wheel. This disc presents a constantly flexing, movable surface to the pin as the latter is rotated thereover by the worm wheel. By this arrangement, vertical and horizontal movements of the upright shaft are resisted, with elimination of the gear noise and pounding upon the bearings to which reference has hereinbefore been made, and the pin is supported, without other adjuncts, against vertical displacement from the worm wheel.

The invention further contemplates, as an alternate construction, a driving mechanism employing a resilient disc in the relationship heretofore discussed, the disc being provided with means to impose an additional force or drag upon the driving mechanism during phases of the operating cycle when there is a reversal of the load imposed upon the worm and worm wheel due to momentum of the washing fluid and fabrics as heretofore discussed. By this arrangement the total effective load or drag upon the worm and worm wheel are rendered more nearly constant during all phases of operation, further eliminating noise and chattering of the parts.

These and other objects and advantages will become apparent from the following description of the typical embodiments of the invention shown in the accompanying drawing, wherein:

Fig. 1 is a bottom plan view of a washing machine, with portions of the gear case broken away and appearing in section;

Fig. 2 is a vertical sectional view taken along line 2—2 of Fig. 1; and,

Figs. 3 and 4 are, respectively, plan and side elevational views of an alternate form of disc provided with load imposing means.

As shown in the drawings, the machine may include a tub 11 carried by a sheet metal skirt 12 supported upon feet or casters 13. Secured to this tub by any suitable means, which may include a brace 14, is a gear case 15 including a casting 16 and a cover plate 17 fastened to the casting by screws 18, the case normally being partially filled with oil or other lubricant. An electric motor 19 may be mounted upon the gear case by bracket 21 connected to lugs 22 formed on the case, and has a drive shaft 23 which may be joined by a flexible coupling 24 to a shaft 25 journalled in the case.

The shaft 25, carrying worm 26 in mesh with worm wheel 27, is journalled in suitable bearings associated with the casing, including a ball bearing 28 adapted to carry the thrust load incident to the worm driving the worm wheel. The latter is keyed to an upright shaft 29 which may extend through a wringer post 21 for operating wringer mechanism, not shown, mounted on the upper end of the post. As depicted in Fig. 2, the shaft 29 may be journalled in a bearing 32 provided at its lower end with a flange 33 for taking the upward thrust of worm wheel 27 that is produced by the driving action of worm 26.

Connected eccentrically to wheel 27 by a crank pin 34 is a pitman or rack bar 35 which has a driving engagement with a wheel 36 secured to the agitator shaft 37 of the machine. In the illustrated embodiment the rack bar 35 is shown provided with teeth 38 meshed with gear teeth formed on wheel 36.

Integral with crank pin 34 and fixed to rack bar 35 is a shoe 41 engaging the upper surface of a disc 42. The latter, preferably formed of spring steel or like resilient material, is secured at its center by a bolt 43 to casing cover 17, being spaced from the latter by a member 44. Preferably the bolt 43 and disc 42 are co-axial with shaft 29 and wheel 27, and the disc is provided with a non-circular opening receiving a non-circular portion of the bolt, whereby the disc is held against rotation.

The spacing member 44 is of such height that the portion of the disc engaged with the shoe 41 is flexed downwardly by the latter, creating a spring pressure retaining the crank pin 34 in its uppermost position in the eccentrically located bore 45 in the wheel 27, and maintaining the shoulder 46 at the upper end of shoe 41 under spring pressure against the lower face of the wheel and the latter against the flange 33 of bearing 32. The flexure of the disc 42 also imposes an outward thrust on the pin 34, tending to prevent it from shifting horizontally in its bearing.

In operation of the machine, rotation of worm 26 by motor 19, counterclockwise as viewed in Fig. 2, will rotate worm wheel 27, counterclockwise as viewed in Fig. 1, and the resulting reciprocation of rack bar 35 will effect angular oscillation of the wheel 36 and agitator shaft 37. The agitator is, of course, accelerated as it approaches each medial phase of each oscillation and thereafter is decelerated as it approaches each terminal phase of each oscillation; and due to the momentum acquired by the agitator unit, washing fluid and material being washed, during the decelerating phase, a reverse load may be imposed upon the rack bar, causing it to tend to drive the wheel 27 instead of being driven by the latter, and causing a reversal of the normal loads imposed upon wheel 27, worm 26, and bearings 45, 32, 33 and 28.

The spring disc 42, however, acts to maintain the wheel 27 pressed upwardly against the bearing 32, 33, thereby avoiding chattering or pounding of these parts and retaining the wheel and worm in the same condition of mesh, with consequent reduction of noise. In operation it will be understood that the disc 42, although held against rotation, is constantly moving, being flexed downwardly in progression around its center by the rotating shoe 41.

In the form of the invention shown in Figs. 3 and 4, there is provided on the disc depending spring fingers 45 adapted to engage the case cover member 17 when the disc is flexed, for the purpose of resisting such flexure. The fingers are disposed adjacent the surface portions of the disc which are engaged by shoe 41 when the rack bar is in the phases of its oscillation during which it is imposing a reverse load upon the driving parts. By this arrangement the increased resistance to downward flexure created by fingers 45 engaging the surface of member 17 and being flexed, will cause greatly increased friction between the parts, particularly between shoe 41 and plate 42 during the phases of operation just discussed. The additional load thus imposed on the driving parts will offset and tend to balance the reverse load condition occurring during these phases, thus rendering the effective total load more constant throughout the operating cycle. In this manner variation of the thrusts imposed upon bearing 28 and the bearing 32, 33 are likewise made more uniform, thereby reducing chattering, noise and wear of the parts.

It will be understood that the devices herein shown and described are merely illustrative of the inventive principles involved, and that these principles may be otherwise embodied without departing from the spirit of the invention or the scope of the appended claims.

What is claimed is:

1. In combination, a rotatable member, a crank pin engaged therewith in eccentric relation to the axis of rotation thereof, a resilient disc disposed in co-axial relation to said rotatable member, and means associated with said pin engaging and progressively flexing said disc.

2. In combination, a pitman, means connected to one end of the pitman for rotating it, said end of the pitman being eccentric to the axis of rotation of said means, a disc disposed in co-axial relation to said axis of said means, and means associated with said end of the pitman engaging and progressively flexing said disc.

3. In combination, a reciprocating member, means connected to one end of said member for rotating it, a resilient member disposed adjacent said end of the said reciprocating member, and a shoe associated with said end of the reciprocating member and rotatable therewith in an annular path about the axis of rotation of said means, said shoe engaging and progressively flexing the resilent member as said shoe rotates.

4. In combination, a rotatable member, a crank pin engaged therewith, a resilient member disposed adjacent said rotatable member, a shoe associated with the crank pin engaging and flexing the resilient member as said pin rotates with said rotatable member, and means for resisting flexure of said resilient member at predetermined points thereon.

5. In combination, a reciprocating member, means connected to one end of said member for rotating it, a resilient member disposed adjacent said end of the said reciprocating member, a shoe associated with said end of the reciprocating member and rotatable therewith, said shoe engaging and flexing the resilient member as said shoe rotates, and means for resisting flexure of said resilient member at predetermined points thereon.

6. In combination, a reciprocating member, means connected to one end of said member for rotating it, a resilient member disposed adjacent said end of the said reciprocating member, a shoe associated with said end of the reciprocating member and rotatable therewith, said shoe engaging and flexing the resilient member as said shoe rotates, and means for resisting flexure of said resilient member at points thereon engaged by said shoe during periods of deceleration of said reciprocating member.

7. In combination, a rotatable drive element and a reciprocating element driven thereby, and friction means for imposing a load upon said drive element during rotation thereof, and means associated with said friction means for imposing an additional load upon said drive element during the phases of rotation thereof when said driven element is decelerating.

8. In combination, a rotatable drive element and a reciprocating element driven thereby, a disc disposed in co-axial relation to said drive element and means for supporting said disc disposed substantially centrally thereof, means rotatable with the drive element engaging said disc adjacent the periphery thereof and flexing said disc, and means associated with predetermined peripheral portions of said disc for resisting flexure thereof.

9. In combination, a rotatable member, a crank pin engaged therewith and movable therewith in a circular path, and resilient means engaging said pin and maintaining a pressure thereon tending to hold said pin relative to said rotatable member, said means having an annular surface around which the pin moves in said circular path during rotation of said rotatable member.

RAYMON E. ROUSSEAU.
LUKE J. STRAUSS.